United States Patent
Luo et al.

(10) Patent No.: US 12,098,968 B2
(45) Date of Patent: Sep. 24, 2024

(54) DEVICE FOR PULLING OUT OPTICAL FIBER, METHOD FOR PULLING OUT OPTICAL FIBER, AND METHOD FOR INSPECTING OPTICAL FIBER

(71) Applicant: Fujikura Ltd., Tokyo (JP)

(72) Inventors: Shengyang Luo, Sakura (JP); Satoshi Matsunaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 295 days.

(21) Appl. No.: 17/763,921

(22) PCT Filed: Sep. 29, 2020

(86) PCT No.: PCT/JP2020/036808
§ 371 (c)(1),
(2) Date: Mar. 25, 2022

(87) PCT Pub. No.: WO2021/065867
PCT Pub. Date: Apr. 8, 2021

(65) Prior Publication Data
US 2022/0341814 A1    Oct. 27, 2022

(30) Foreign Application Priority Data

Sep. 30, 2019  (JP) .................................. 2019-180412

(51) Int. Cl.
*B65H 49/20*  (2006.01)
*B65H 49/34*  (2006.01)
(Continued)

(52) U.S. Cl.
CPC ............. *G01M 11/33* (2013.01); *B65H 49/20* (2013.01); *B65H 49/34* (2013.01); *B65H 63/006* (2013.01);
(Continued)

(58) Field of Classification Search
CPC ...... B65H 49/20; B65H 49/34; B65H 63/006; B65H 2515/31; B65H 2701/32;
(Continued)

(56) References Cited

U.S. PATENT DOCUMENTS 4,379,615 A * 4/1983 Toda ..................... H02G 11/02
242/388.6
5,394,606 A * 3/1995 Kinoshita ............ G02B 6/4457
356/73.1
(Continued)

FOREIGN PATENT DOCUMENTS

CN        1445522 A     10/2003
CN      103193106 A      7/2013
(Continued)

OTHER PUBLICATIONS

International Search Report issued in corresponding International Application No. PCT/JP2020/036808, mailed on Dec. 8, 2020 (3 pages).
(Continued)

*Primary Examiner* — Ryan A Lepisto
(74) *Attorney, Agent, or Firm* — Osha Bergman Watanabe & Burton LLP

(57) ABSTRACT

A device that pulls out an optical fiber includes: a bobbin support that supports a bobbin rotatably about a rotation axis; a first pulling out unit that holds a first end of the optical fiber, pulls out a first portion of the optical fiber wound around the bobbin from a side of the first end in a state where the bobbin rotates in a predetermined direction, and returns a part of the first portion to the bobbin in a state where the bobbin rotates in a direction opposite to the predetermined direction; and a second pulling out unit that holds a second end of the optical fiber after the first pulling out unit pulls out the first portion from the side of the first
(Continued)

end, and pulls out a second portion of the optical fiber wound around the bobbin from a side of the second end.

9 Claims, 8 Drawing Sheets

(51) Int. Cl.
  *B65H 63/00* (2006.01)
  *G01M 11/00* (2006.01)
  *G01M 11/02* (2006.01)
  *G02B 6/44* (2006.01)

(52) U.S. Cl.
  CPC .... *G01M 11/0207* (2013.01); *G01M 11/3109* (2013.01); *G02B 6/4457* (2013.01); *G02B 6/44785* (2023.05); *B65H 2515/31* (2013.01); *B65H 2701/32* (2013.01)

(58) Field of Classification Search
  CPC ......... G01M 11/0207; G01M 11/3109; G01M 11/33; G02B 6/4457; G02B 6/44785
  See application file for complete search history.

(56) References Cited

U.S. PATENT DOCUMENTS

| | | | | |
|---|---|---|---|---|
| 7,053,995 | B1 * | 5/2006 | Anderson | G01N 1/286 |
| | | | | 356/73.1 |
| 11,248,931 | B2 * | 2/2022 | Nakase | B65H 59/387 |
| 2019/0010013 | A1 | 1/2019 | Furukawa | |

FOREIGN PATENT DOCUMENTS

| | | |
|---|---|---|
| CN | 104276450 A | 1/2015 |
| CN | 105492357 A | 4/2016 |
| JP | S61-102534 A | 5/1986 |
| JP | H04-035104 U | 3/1992 |
| JP | H08-210948 A | 8/1996 |
| JP | H09329718 A | 12/1997 |
| JP | 2003073031 A | 3/2003 |
| JP | 2003-515143 A | 4/2003 |
| JP | 2007-070078 A | 3/2007 |
| JP | 2012-071952 A | 4/2012 |

OTHER PUBLICATIONS

Xu, He, et al., "High-precision Control System on Rewinding and Forming Dyed-fiber," Electric Drive vol. 39, No. 3, Mar. 2009, with English abstract (4 pages).

* cited by examiner

DEVICE FOR PULLING OUT OPTICAL FIBER, METHOD FOR PULLING OUT OPTICAL FIBER, AND METHOD FOR INSPECTING OPTICAL FIBER

TECHNICAL FIELD

The present invention relates to a device for pulling out an optical fiber, a method for pulling out an optical fiber, and a method for inspecting an optical fiber.

BACKGROUND

In general, in a process of manufacturing an optical fiber, the optical fiber is wound around a bobbin from the viewpoint of transportability and the like. Then, various inspections using an optical time domain reflectometer (OTDR) or the like are performed on the optical fiber wound around the bobbin as described above. Patent Literature 1 described below describes a device for measuring characteristics of an optical fiber wound around a bobbin.

In the characteristic measurement device of Patent Literature 1 described below, an optical fiber to which a light source is connected is connected to one end of an optical fiber to be discharged from a bobbin, and an optical fiber to which a photodetector is connected is connected to the other end of the optical fiber to be discharged from the bobbin. Then, in this characteristic measurement device, light emitted from a light source is made incident on the one end of an optical fiber discharged from the bobbin, and characteristics of the optical fiber wound around the bobbin are measured on the basis of the amount of light received by the photodetector or the like.

PATENT LITERATURE

[Patent Literature 1] JP 61-102534 A

As in the characteristic measurement device described in Patent Literature 1 described above, in the characteristic measurement performed with respect to the optical fiber wound around the bobbin, it is necessary to pull out one end side and the other end side of the optical fiber from the bobbin a certain length in preparation for performing the measurement. In general, an operation of pulling out the one end side and the other end side of the optical fiber from the bobbin is performed by an operator. For this reason, a device for pulling out an optical fiber capable of pulling out one end side and the other end side of the optical fiber from a bobbin is desired.

SUMMARY

One or more embodiments of the present invention provide a device for pulling out an optical fiber capable of pulling out one end side and the other end side of an optical fiber from a bobbin, a method for pulling out an optical fiber, and a method for inspecting an optical fiber.

According to one or more embodiments, a device for pulling out an optical fiber that pulls out the optical fiber from a bobbin around which the optical fiber is wound and which is rotatable about a rotation axis includes: a first pulling out unit configured to hold one end section of the optical fiber, pulls out a predetermined portion of the optical fiber wound around the bobbin from the one end section side in a state where the bobbin rotates in a predetermined direction, and then returns a part of the predetermined portion of the optical fiber to the bobbin in a state where the bobbin rotates in a direction opposite to the predetermined direction; and a second pulling out unit configured to hold the other end section of the optical fiber after the first pulling out unit pulls out the predetermined portion of the optical fiber from the one end section side, and pulls out the other predetermined portion of the optical fiber wound around the bobbin from the other end section side when the first pulling out unit returns the part of the predetermined portion of the optical fiber to the bobbin.

According to one or more embodiments, a method for pulling out an optical fiber that pulls out the optical fiber from a bobbin around which the optical fiber is wound and which is rotatable about a rotation axis includes: a first holding step of holding one end section of the optical fiber; a first pulling out step of pulling out a predetermined portion of the optical fiber wound around the bobbin from the one end section side in a state where the bobbin rotates in a predetermined direction after the first holding step; a second holding step of holding the other end section of the optical fiber after the first pulling out step; and a second pulling out step of returning a part of the predetermined portion of the optical fiber to the bobbin in a state where the bobbin rotates in a direction opposite to the predetermined direction and pulling out the other predetermined portion of the optical fiber wound around the bobbin from the other end section side after the second holding step.

With the optical fiber pulling out device and by the optical fiber pulling out method, the one end section of the optical fiber is held, and a predetermined portion of the optical fiber wound around the bobbin is pulled out from one end section side in a state where the bobbin rotates in a predetermined direction. Next, the other end section of the optical fiber is held. Then, the other predetermined portion of the optical fiber wound around the bobbin is pulled out from the other end section side in a state where the bobbin rotates in a direction opposite to the aforementioned predetermined direction. At this time, in order to return a part of the predetermined portion of the pulled out optical fiber to the bobbin, the bobbin winds up the optical fiber thus returned. That is, the bobbin winds up a part of the predetermined portion of the optical fiber pulled out from the one end section side. Furthermore, the bobbin feeds the wound optical fiber to the other end section side. Then, the other predetermined portion of the optical fiber wound around the bobbin is pulled out from the other end section side. As described above, the optical fiber wound by the bobbin is a part of the predetermined portion of the optical fiber pulled out from the one end section side. Therefore, with the optical fiber pulling out device and by the optical fiber pulling out method, the one end side and the other end side of the optical fiber can be pulled out from the bobbin. Further, with the optical fiber pulling out device and by the optical fiber pulling out method, since the optical fiber is pulled out in a state where the bobbin rotates, it is possible to suppress twisting of the pulled out optical fiber. Note that the bobbin may be rotated by, for example, tension generated in the optical fiber pulled out when the optical fiber is pulled out.

The optical fiber pulling out device described above may further include a bobbin drive unit configured to rotate the bobbin about the rotation axis, in which the bobbin drive unit rotates the bobbin in the predetermined direction when the first pulling out unit pulls out the predetermined portion of the optical fiber from the one end section side, and rotates the bobbin in a direction opposite to the predetermined direction when the first pulling out unit returns the part of the predetermined portion of the optical fiber to the bobbin.

With such a configuration, the tension generated in the optical fiber when the optical fiber is pulled out can be reduced as compared with the case where the bobbin drive unit for rotating the bobbin is not provided.

At least one of the first pulling out unit and the second pulling out unit may pull out the optical fiber in a direction not parallel to the rotation axis.

With such a configuration, as compared with the case where the optical fiber is pulled out in a direction parallel to the rotation axis, for example, it is possible to suppress that the optical fiber is unintentionally pulled out from the bobbin and twisting occurs in the pulled out optical fiber.

The first pulling out unit may pull out the predetermined portion of the optical fiber so that tension generated in the predetermined portion of the optical fiber pulled out from the bobbin falls within a predetermined range, and return the part of the predetermined portion of the optical fiber to the bobbin so that tension generated in the part of the predetermined portion of the optical fiber returned to the bobbin falls within the predetermined range, and the second pulling out unit may pull out the other predetermined portion of the optical fiber so that tension generated in the other predetermined portion of the optical fiber falls within the predetermined range.

The optical fiber pulling out device can suppress that the optical fiber is slackened when the optical fiber is pulled out and the optical fiber is caught by another member or the like. Further, the optical fiber pulling out device can suppress that the tension generated in the optical fiber excessively increases when the optical fiber is pulled out.

At least one of the first pulling out unit and the second pulling out unit may pull out the optical fiber by winding the optical fiber.

With such a configuration, it is possible to suppress an increase in size of the optical fiber pulling out device as compared with the case where the first pulling out unit and the second pulling out unit pull out the optical fiber without winding the optical fiber.

When at least one of the first pulling out unit and the second pulling out unit winds the optical fiber to pull out the optical fiber, at least one of the first pulling out unit and the second pulling out unit may have a clamping unit including a pair of clamping pieces facing each other in a direction of a predetermined axis direction, and the clamping unit may clamp an end section of the optical fiber in the direction of the predetermined axis by the pair of clamping pieces, rotate about the predetermined axis in a state of clamping the end section, and wind the optical fiber around an outer peripheral surface relative to the predetermined axis to pull out the optical fiber.

In this case, the pair of clamping pieces may have a notch, and the notch may form a groove extending from one end to the other end in the direction of the predetermined axis on the outer peripheral surface of the clamping unit relative to the predetermined axis in a state where at least the pair of clamping pieces clamps the end section.

With the optical fiber pulling out device, the optical fiber wound around the outer peripheral surface of the clamping unit relative to the predetermined axis crosses the aforementioned groove, and a gap is formed in a part between the outer peripheral surface of the clamping unit relative to the predetermined axis and the optical fiber wound around the outer peripheral surface. Therefore, as compared with the case where the groove is not formed in the clamping unit, the optical fiber pulling out device can easily grip the optical fiber wound around the clamping unit, and can easily handle the pulled out optical fiber. For example, when the optical fiber is cut between the bobbin and the clamping unit, a portion of the optical fiber wound around the clamping unit crossing the groove is gripped, and then the clamping of the optical fiber by the clamping unit is released, so that the pulled out optical fiber in a ring shape can be collected.

The optical fiber pulling out device described above may further include: a position detection unit configured to output a signal indicating a position of the one end section hanging by its own weight in the direction of the rotation axis, in which the first pulling out unit may hold the one end section hanging by its own weight on the basis of the signal. Further, the optical fiber pulling out device described above may further include: another position detection unit configured to output another signal indicating a position of the other end section hanging by its own weight in the direction of the rotation axis, in which the second pulling out unit may hold the other end section hanging by its own weight on the basis of the another signal.

Further, a method for inspecting an optical fiber according to the present invention includes: after the one end section side and the other end section side of the optical fiber are pulled out from a bobbin on which the optical fiber is wound by the method for pulling out an optical fiber described above, a measurement step of connecting the one end section and the other end section of the optical fiber to a measurement device and measuring characteristics of the optical fiber wound around the bobbin by the measurement device.

After the one end section side and the other end section side of the optical fiber are pulled out from the bobbin, the measurement step may obtain a part of the optical fiber by cutting at least one of the one end section and the other end section of the optical fiber and then connect the one end section and the other end section of the optical fiber wound around the bobbin to the measurement device.

As described above, according to the present invention, a device for pulling out an optical fiber capable of pulling out one end side and the other end side of an optical fiber from a bobbin, a method for pulling out an optical fiber, and a method for inspecting an optical fiber are provided.

DETAILED DESCRIPTION

Figure 1:
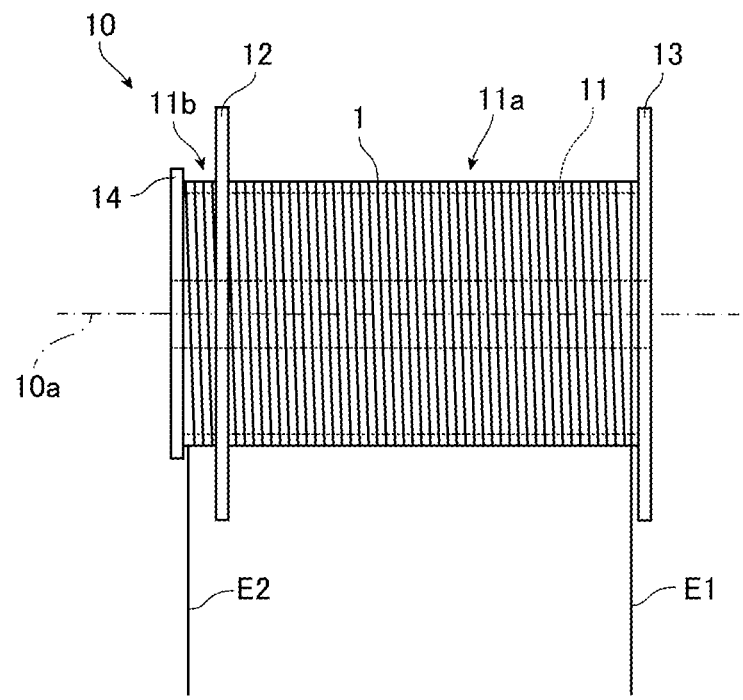
FIG. 1 is a front view schematically illustrating a bobbin according to one or more embodiments of the present invention.

One or more embodiments of a device for pulling out an optical fiber and a method for pulling out an optical fiber according to the present invention will be described below in detail with reference to the drawings. The embodiments illustrated below are for facilitating the understanding of the present invention, and are not for limiting the interpretation of the present invention. The present invention can be changed or modified without departing from the spirit. Note that, in the drawings referred to below, the dimensions of each member may be changed for ease of understanding.

First Example

Figure 2:
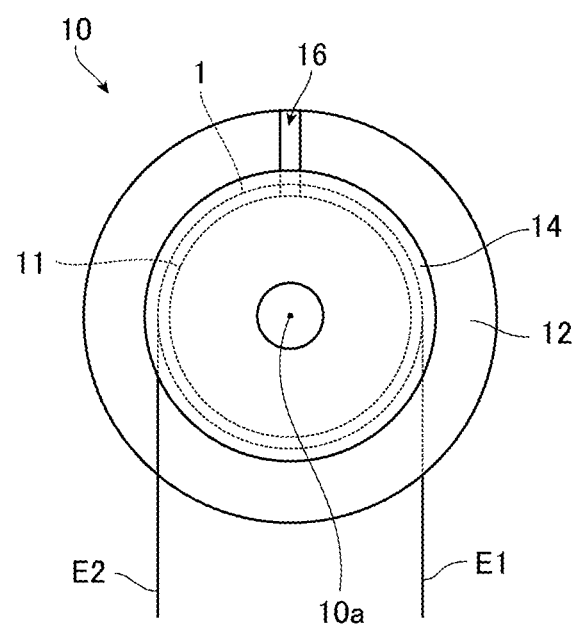
FIG. 2 is a side view schematically illustrating the bobbin illustrated in FIG. 1.

FIG. 1 is a front view schematically illustrating a bobbin according to one or more embodiments of the present invention, and FIG. 2 is a side view schematically illustrating the bobbin illustrated in FIG. 1. Note that, in FIGS. 1 and 2, the top side is the upper side, and the bottom side is the lower side. A bobbin 10 is a member around which an optical fiber is wound in a predetermined winding direction. As illustrated in FIGS. 1 and 2, the bobbin 10 of one or more embodiments includes a shaft 11, a first flange 12, and a second flange 13.

The shaft 11 is a member having a cylindrical shape extending along a rotation axis 10a, and an outer diameter of the shaft 11 is substantially constant along the rotation axis 10a. A rib 14 protruding outward in the radial direction from an outer peripheral surface of the shaft 11 is formed at one end section of the shaft 11. The rib 14 extends over the entire circumference of the shaft 11.

The first flange 12 and the second flange 13 are members having a plate shape protruding outward in the radial direction from the outer peripheral surface of the shaft. The outer shapes of the first flange 12 and the second flange 13 are substantially circular about the rotation axis 10a. The first flange 12 and the second flange 13 are spaced apart from each other at a predetermined interval in the direction of the rotation axis 10a. The second flange 13 is located at an end section of the shaft 11 opposite to the rib 14 side, and the first flange 12 is located between the rib 14 and the second flange 13 in the direction of the rotation axis 10a. The distance between the first flange 12 and the second flange 13 in the direction of the rotation axis 10a is larger than the distance between the first flange 12 and the rib 14 in the direction of the rotation axis 10a. The first flange 12 is formed with a communication port 16 that communicates the second flange 13 side with the rib 14 side relative to the first flange 12. The communication port 16 of one or more embodiments is a notch extending from an outer edge of the first flange 12 toward the shaft 11 side. Note that the communication port 16 is not particularly limited, and may be a through-hole extending in the direction of the thickness of the first flange 12. Examples of the material constituting the bobbin 10 include resin.

In one or more embodiments, an optical fiber 1 is wound on the shaft 11 around a portion between the first flange 12 and the second flange 13 and a portion between the first flange 12 and the rib 14. Specifically, one side of the optical fiber 1 in the longitudinal direction is wound around a portion of the shaft 11 between the first flange 12 and the second flange 13 in a predetermined winding direction. One end section E1 of the optical fiber 1 is discharged from this portion. Therefore, the portion of the shaft 11 between the first flange 12 and the second flange 13 can be understood as a first winding unit 11a around which the one end section E1 side of the optical fiber 1 in the longitudinal direction is wound and from which the one end section E1 of the optical fiber 1 is discharged. Further, the other side of the optical fiber 1 in the longitudinal direction is led to a portion of the shaft 11 between the first flange 12 and the rib 14 through the communication port 16 and wound around this portion in the predetermined winding direction described above. The other end section E2 of the optical fiber 1 is discharged from this portion. Therefore, the portion of the shaft 11 between the first flange 12 and the rib 14 can be understood as a second winding unit 11b around which the other end section E2 side of the optical fiber 1 in the longitudinal direction is wound and from which the other end section E2 of the optical fiber 1 is discharged. Here, FIGS. 1 and 2 illustrate the bobbin 10 in a state where the rotation axis 10a extends substantially in the horizontal direction, and the one end section E1 and the other end section E2 of the optical fiber 1 are hanging by their own weight. Note that, as described above, since the shaft 11 is a member having a cylindrical shape extending along the rotation axis 10a, the optical fiber 1 is wound around the bobbin 10 in the predetermined winding direction about the rotation axis 10a. Such a bobbin 10 rotates in a predetermined direction around the rotation axis 10a, for example, clockwise in FIG. 2, so that the wound optical fiber 1 can be fed to the one end section E1 side. Further, the bobbin 10 rotates in a direction opposite to the aforementioned predetermined direction around the rotation axis 10a, for example, counterclockwise in FIG. 2, so that the wound optical fiber 1 can be fed to the other end section E2 side.

Note that it is sufficient if the optical fiber 1 is wound around the bobbin 10 and the bobbin 10 rotates in the predetermined direction around the rotation axis 10a, so that the optical fiber 1 can be fed to one end section side, and the bobbin 10 rotates in a direction opposite to the aforementioned predetermined direction around the rotation axis 10a, so that the optical fiber 1 can be fed to the other end section side. For example, the first winding unit 11a and the second winding unit 11b may not be partitioned by the first flange 12. For example, instead of the rib 14, the first flange 12 may be formed at one end section of the shaft 11.

Further, the optical fiber 1 wound around the bobbin 10 is not particularly limited. The optical fiber 1 may be, for example, a bare optical fiber including a core and a clad, or an optical fiber in which the outer periphery of the bare optical fiber is surrounded by a coating layer.

Next, a pulling out device 20 for the optical fiber 1 according to one or more embodiments will be described.

Figure 3:
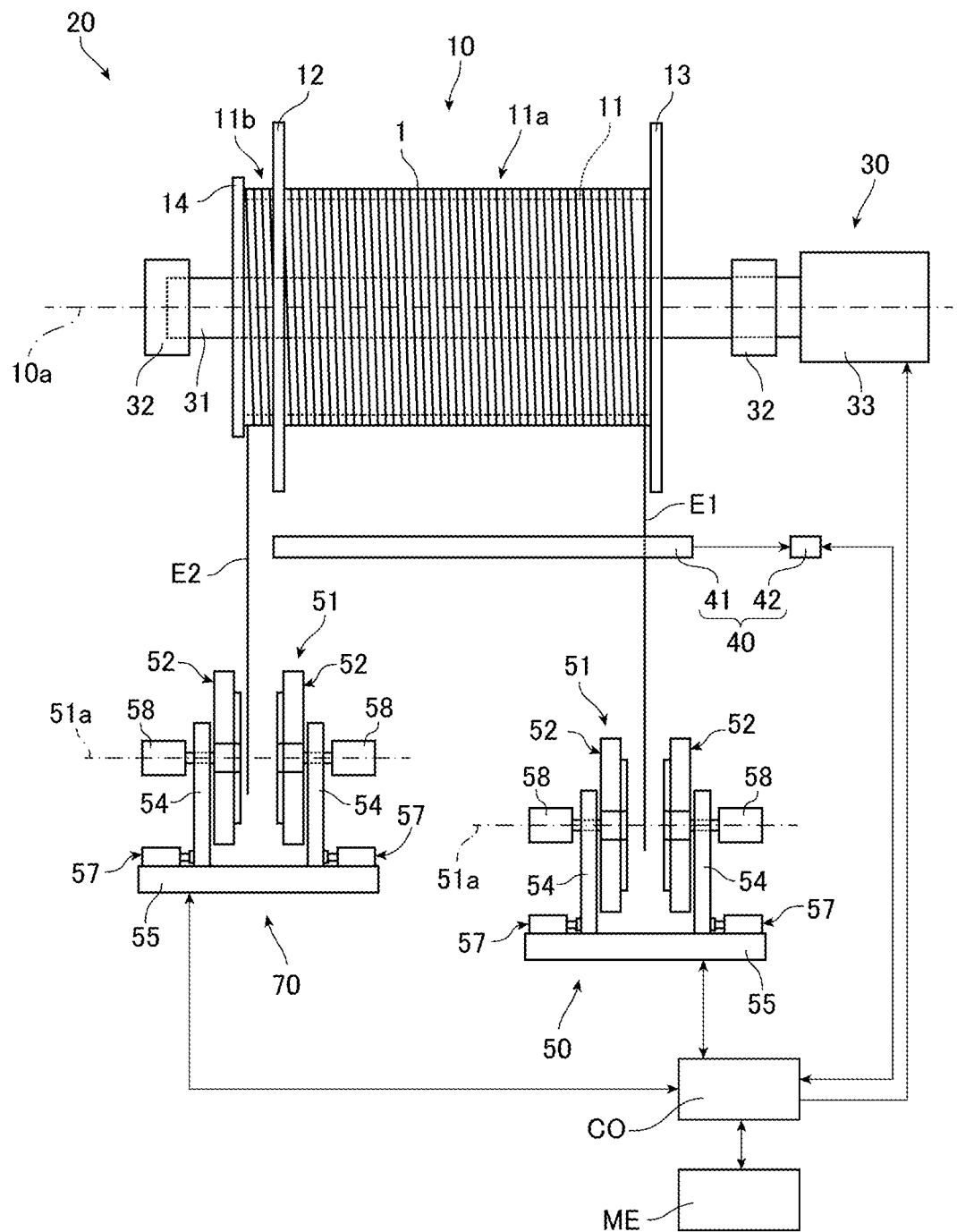
FIG. 3 is a diagram schematically illustrating a device for pulling out an optical fiber according to one or more embodiments of the present invention.

FIG. 3 is a diagram schematically illustrating a device for pulling out an optical fiber according to one or more embodiments. As illustrated in FIG. 3, the pulling out device 20 for the optical fiber 1 of one or more embodiments includes a bobbin drive unit 30, a position detection unit 40 (i.e., position detector), a first pulling out unit 50, a second pulling out unit 70, a control unit CO, and a storage unit ME as main configurations.

The control unit CO includes, for example, an integrated circuit such as a microcontroller, an integrated circuit (IC), a large-scale integrated circuit (LSI), or an application specific integrated circuit (ASIC), or a numerical control (NC) device. Further, when the NC device is used, the control unit CO may use a machine learning device or may not use a machine learning device. As described below, some configurations of the pulling out device 20 for the optical fiber 1 are controlled by the control unit CO.

Further, the storage unit ME is connected to the control unit CO. The storage unit ME is configured to be able to store information and read the stored information. Information necessary for control of the pulling out device 20 by the control unit CO to be described below is stored in the storage unit ME, and the control unit CO refers to the information stored in the storage unit ME as appropriate. Examples of the storage unit ME include a semiconductor memory such as a ROM and a magnetic disk.

The bobbin drive unit 30 is a member that rotates the bobbin 10 about the rotation axis 10a. The bobbin drive unit 30 of one or more embodiments includes a shaft 31, a bearing unit 32, and a motor 33 (i.e., rotary driver), and rotates the bobbin 10 about the rotation axis 10a in a state where the rotation axis 10a extends substantially in the horizontal direction. The shaft 31 is a member having a columnar shape extending substantially in the horizontal direction, and an outer diameter of the shaft 31 is substantially the same as an inner diameter of the cylindrical shaft 11 of the bobbin 10. The shaft 31 is inserted into an internal space of the shaft 11 of the bobbin 10, and the bobbin 10 is fixed to the shaft 31. Therefore, the shaft 31 extends along the rotation axis 10a, and the rotation axis 10a extends substantially in the horizontal direction. When the shaft 31 rotates about the rotation axis 10a, the bobbin 10 also rotates about the rotation axis 10a. The shaft 31 is rotatably supported about the rotation axis 10a by the bearing unit 32. The motor 33 is connected to the shaft 31. The shaft 31 is rotated about the rotation axis 10a by the motor 33. The motor 33 adjusts the rotation speed and the rotation direction of the shaft 31 in accordance with a control signal from the control unit CO to adjust the rotation speed and the rotation direction of the bobbin 10. Note that it is sufficient if the bobbin drive unit 30 rotates the bobbin 10 about the rotation axis 10a. For example, the bobbin drive unit 30 may further include a power transmission unit that transmits the driving force of the motor 33 to the shaft 31. The shaft 31 and the bearing unit 32 constitute a bobbin support.

The position detection unit 40 is a member that detects the position of the one end section E1 hanging by its own weight in the direction of the rotation axis 10a. The position detection unit 40 of one or more embodiments includes a sensor 41 having a light emitting surface that emits light and a light receiving surface that receives the light emitted from the light emitting surface, and an image processing unit 42. The sensor 41 extends in a direction substantially parallel to the rotation axis 10a, and is arranged such that the one end section E1 of the optical fiber 1 is located between the light emitting surface and the light receiving surface below the bobbin 10. Thus, a part of the light emitted from the light emitting surface is blocked or reflected by the one end section E1, and the one end section E1 is projected onto the light receiving surface of the sensor 41. Further, the sensor 41 intersects with a plane perpendicular to the rotation axis 10a and passing through the first flange 12 and a plane perpendicular to the rotation axis 10a and passing through the second flange 13. In such position detection unit 40, the sensor 41 outputs a projection image of the one end section E1 projected on the light receiving surface to the image processing unit 42 as a one-dimensional image. The image processing unit 42 detects the position of the one end section E1 in the direction of the rotation axis 10a on the basis of the image, and outputs a signal indicating the detected position to the control unit CO. Thus, the position detection unit 40 detects the position of the one end section E1 hanging by its own weight in the direction of the rotation axis 10a. Examples of the configuration of the image processing unit 42 include a configuration similar to that of the control unit CO, and the control unit CO may also serve as the image processing unit 42.

Note that it is sufficient if the position detection unit 40 can detect the position of the one end section E1 hanging by its own weight in the direction of the rotation axis 10a. For example, the position detection unit 40 may be configured to include a sensor having a light receiving surface and a light emitting surface similarly to the sensor 41 described above, and a sensor movement unit that moves the sensor in the direction of the rotation axis 10a and outputs a signal indicating the position of the sensor. In this case, when the sensor crosses the one end section E1, a part of the light emitted from the light emitting surface is blocked or reflected by the one end section E1, and the light reception amount of the sensor changes. Therefore, for example, the sensor movement unit outputs a signal indicating the position of the sensor when the light reception amount of the sensor becomes smaller or larger than a predetermined amount to the control unit CO. Even with such position detection unit 40, the position of the one end section E1 can be detected. Further, the position detection unit 40 may include a camera that captures an image of the lower side of the bobbin 10 instead of the sensor 41. In this case, the camera outputs the captured image to the image processing unit 42. The image processing unit 42 detects the position of the one end section E1 in the direction of the rotation axis 10a on the basis of the image input from the camera, and outputs a signal indicating the detected position to the control unit CO. Here, in one or more embodiments, the position of the one end section E1 perpendicular to the rotation axis 10a and in the horizontal direction is stored in the storage unit ME in advance.

The first pulling out unit 50 is a member that holds the one end section E1, pulls out a predetermined portion of the optical fiber 1 wound around the bobbin 10 from the one end section E1 side, and returns a part of the predetermined portion of the pulled out optical fiber 1 to the bobbin 10. Further, the second pulling out unit 70 is a member that holds the other end section E2 and pulls out the other predetermined portion of the optical fiber 1 wound around the bobbin 10 from the other end section E2 side. In one or more embodiments, the first pulling out unit 50 and the second pulling out unit 70 have the same configuration. Therefore, the first pulling out unit 50 will be described below, and the description of the second pulling out unit 70 will be appropriately omitted.

Figure 4:
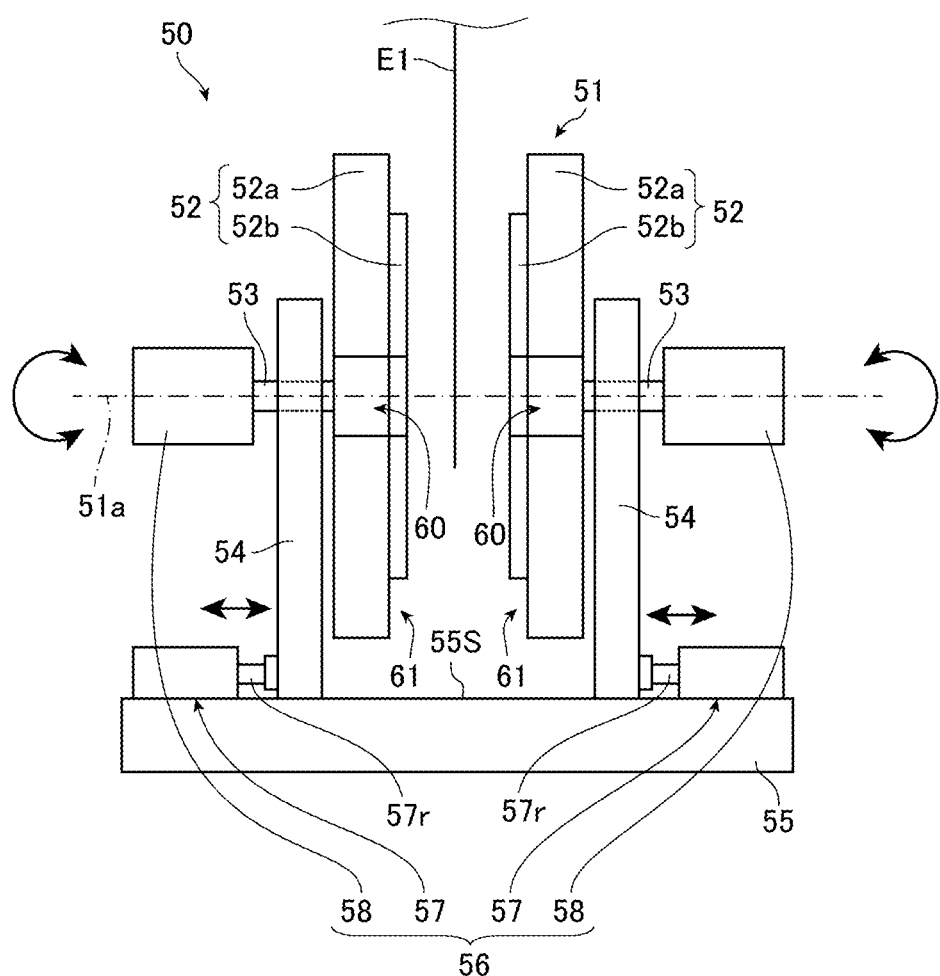
FIG. 4 is an enlarged diagram of a first pulling out unit illustrated in FIG. 3.

FIG. 4 is an enlarged diagram of the first pulling out unit 50 illustrated in FIG. 3. As illustrated in FIGS. 3 and 4, the first pulling out unit 50 of one or more embodiments includes a clamping unit 51, a support unit 55, and a drive unit 56. Further, the first pulling out unit 50 can be arranged at a position below the sensor 41 or in the vicinity of a processing device or the like, which is not illustrated, by a movement device, which is not illustrated. The control unit CO causes the movement device to arrange the first pulling out unit 50 at a position. Examples of the movement device include a robot arm that grips the support unit 55.

The clamping unit 51 (i.e., clamp) includes a pair of clamping pieces 52 facing each other in the direction of an axis 51a. In one or more embodiments, the axis 51a extends substantially parallel to the rotation axis 10a, and each of the pair of clamping pieces 52 has a main body unit 52a and a contact unit 52b. Each of the main body units 52a is a member having a circular plate shape about the axis 51a, and outer diameters of the main body units 52*a* are substantially the same. Each of the contact units 52*b* is a sheet-like elastic member attached to a surface of the main body unit 52*a* on a side facing the other main body unit 52*a*. An outer shape of each of the contact units 52*b* is a circular shape about the axis 51*a*, and outer diameters of the contact units 52*b* are substantially the same and are smaller than the outer diameter of the main body unit 52*a*. Therefore, a recess 61 along the outer edge is formed on a surface of each of the clamping pieces 52 on a side facing the other clamping piece 52. That is, it can be understood that each of the clamping pieces 52 has the recess 61 on the surface of the side facing the other clamping piece 52. Further, the contact units 52*b* overlap each other in the direction of the axis 51*a*. Note that each of the clamping pieces 52 may not have the recess 61. Further, the extension direction of the axis 51*a* is not limited, and for example, the axis 51*a* may extend substantially perpendicularly to the rotation axis 10*a* and substantially horizontally. Examples of the material constituting the main body unit 52*a* include metal such as aluminum, and examples of the material constituting the contact unit 52*b* include rubber.

Figure 5:
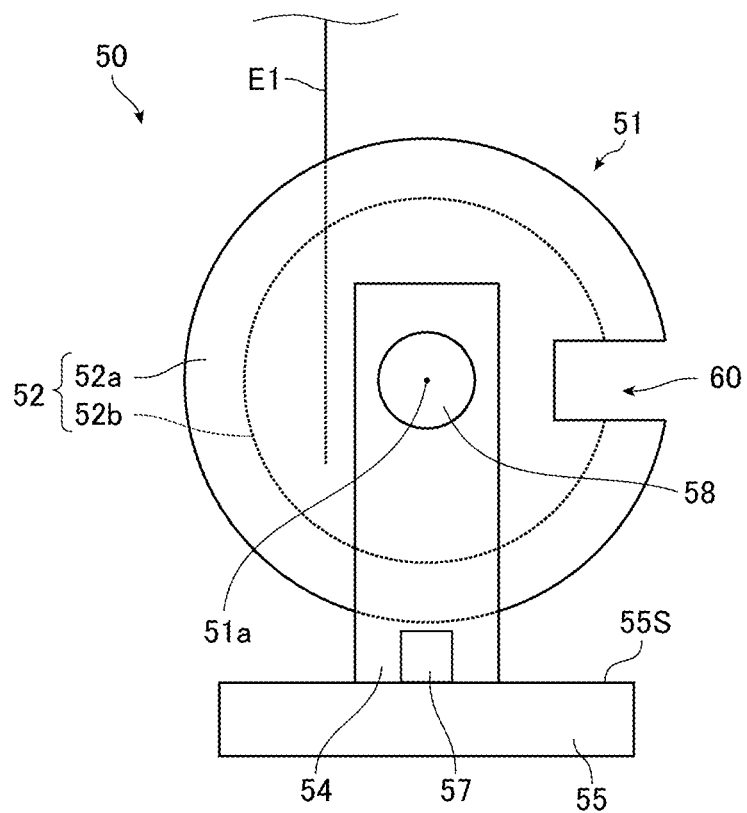
FIG. 5 is a diagram of the first pulling out unit illustrated in FIG. 4 as viewed from an axial direction.

FIG. 5 is a diagram of the first pulling out unit 50 illustrated in FIG. 4 as viewed from the direction of the axis 51*a*. As illustrated in FIG. 5, each of the clamping pieces 52 has a notch 60 extending from the outer edge of the main body unit 52*a* to the axis 51*a* side beyond the outer edge of the contact unit 52*b*. In one or more embodiments, the outer edges of the notches 60 of the respective clamping pieces 52 when viewed from the direction of the axis 51*a* substantially coincide. Note that each of the clamping pieces 52 may not have the notch 60.

Further, as illustrated in FIG. 4, a shaft 53 having a columnar shape extending along the axis 51*a* from the main body unit 52*a* to the side opposite to the other clamping piece 52 side is fixed to each of the clamping pieces 52. Each of the shafts 53 is rotatably supported by a strut 54 about the axis 51*a*, and a torque sensor, which is not illustrated, that measures the torque generated in the shaft 53 and outputs a signal corresponding to the measurement value to the control unit CO is attached to each of the shafts 53. Note that the torque sensor may be attached to only one of the shafts 53.

The support unit 55 is a member that supports the clamping unit 51. In one or more embodiments, the support unit 55 is a member having a plate shape extending in the horizontal direction, and an upper surface 55S of the support unit 55 is a plane substantially parallel to the axis 51*a*. Each strut 54 described above is movably attached to the upper surface 55S of the support unit 55. Specifically, each strut 54 is attached to the upper surface 55S so that each strut 54 moves in a direction parallel to the axis 51*a* such that the state is switched between the state in which the contact units 52*b* of the pair of clamping pieces 52 contact each other and the state in which the contact units 52*b* of the pair of clamping pieces 52 are separated. As described above, each strut 54 is attached to the support unit 55, whereby the clamping unit 51 is supported by the support unit 55. Note that the clamping unit 51 is separated from the support unit 55.

The drive unit 56 of one or more embodiments is a member that moves each of the clamping pieces 52 along the axis 51*a* and rotates the clamping unit 51 about the axis 51*a*. The drive unit 56 includes a pair of cylinders 57 and a pair of motors 58. One cylinder 57 moves one strut 54 along the axis 51*a*, and the other cylinder 57 moves the other strut 54 along the axis 51*a*. One motor 58 rotates one clamping piece 52 about the axis 51*a*, and the other motor 58 rotates the other clamping piece 52 about the axis 51*a*. The pair of cylinders 57 is attached to the upper surface 55S of the support unit 55 such that the two struts 54 are located between the pair of cylinders and are substantially parallel to the axis 51*a*. A tip of one rod 57*r* is fixed to one strut 54, and a tip of the other rod 57*r* is fixed to the other strut 54. Each of the cylinders 57 moves the rod 57*r* to move the strut 54 to which the tip of the rod 57*r* is fixed along the axis 51*a*. Then, in the first pulling out unit 50, the pair of cylinders 57 can switch the clamping unit 51 between the state in which the contact units 52*b* of the pair of clamping pieces 52 contact each other and the state in which the contact units 52*b* of the pair of clamping pieces 52 are separated. The pair of cylinders 57 adjusts the displacement amount of the rod 57*r* in accordance with a control signal from the control unit CO to switch between the state in which the contact units 52*b* of the pair of clamping pieces 52 contact each other and the state in which the contact units 52*b* of the pair of clamping pieces 52 are separated. Note that the number of cylinders 57 may be one. In this case, for example, the strut 54 to which the rod 57*r* of the cylinder 57 is not connected is fixed to the support unit 55.

The shaft 53 fixed to one clamping piece 52 is connected to one motor 58, and the motor 58 rotates the shaft 53 about the axis 51*a* to rotate the one clamping piece 52 about the axis 51*a*. The shaft 53 fixed to the other clamping piece 52 is connected to the other motor 58, and the motor 58 rotates the shaft 53 about the axis 51*a* to rotate the other clamping piece 52 about the axis 51*a*. The pair of motors 58 is driven in synchronization, and one clamping piece 52 and the other clamping piece 52 rotate in synchronization in the same rotation direction at substantially the same speed. That is, the pair of motors 58 rotates the clamping unit 51 about the axis 51*a*. Therefore, the clamping unit 51 rotates around the axis 51*a* while the outer edges of the notches 60 of the pair of clamping pieces 52 when viewed from the direction of the axis 51*a* are suppressed from being misaligned. The pair of motors 58 adjusts the rotation speed and the rotation direction of the shafts 53 in accordance with a control signal from the control unit CO to adjust the rotation speed and the rotation direction of the clamping unit 51. Note that the number of motors 58 may be one. In this case, for example, the motor 58 is connected to the shaft 53 fixed to one clamping piece 52 and the shaft 53 fixed to the other clamping piece 52 via a transmission member including a gear or the like.

As illustrated in FIG. 3, the second pulling out unit 70 is arranged below the second winding unit 11*b* of the bobbin 10 such that the other end section E2 of the optical fiber 1 is positioned between the pair of clamping pieces 52 of the clamping unit 51. Note that the distance between the pair of clamping pieces 52 in the state where the pair of clamping pieces 52 of the clamping unit 51 is the farthest is larger than the width of the second winding unit 11*b* of the bobbin 10 in the direction of the rotation axis 10*a*. Therefore, even when the position of the other end section E2 moves in the direction of the rotation axis 10*a*, the other end section E2 can be positioned between the pair of clamping pieces 52. Note that, similar to the first pulling out unit 50, the second pulling out unit 70 can be arranged at a position or in the vicinity of a processing device or the like, which is not illustrated, by a movement device.

Next, a method for pulling out the optical fiber 1 and a method for inspecting the optical fiber 1 according to one or more embodiments will be described. Specifically, a method of pulling out the one end section E1 side and the other end section E2 side of the optical fiber 1 from the bobbin 10, and a method for inspecting the optical fiber 1 will be described.

Figure 6:
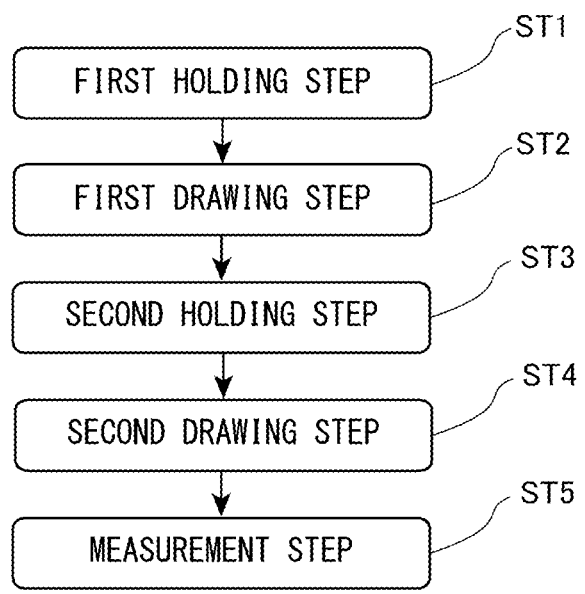
FIG. 6 is a flowchart illustrating steps of a method for pulling out an optical fiber.

FIG. 6 is a flowchart illustrating steps of the method for pulling out the optical fiber 1 and the method for inspecting the optical fiber 1 according to one or more embodiments. As illustrated in FIG. 6, the method for pulling out the optical fiber 1 according to one or more embodiments includes a first holding step ST1, a first pulling out step ST2, a second holding step ST3, and a second pulling out step ST4. Further, the method for inspecting the optical fiber 1 includes a measurement step ST5 of connecting the one end section E1 and the other end section E2 of the optical fiber 1 having the one end section E1 side and the other end section E2 side pulled out from the bobbin 10 by the above steps to a measurement device and measuring characteristics of the optical fiber 1 wound around the bobbin 10 by the measurement device.

<First Holding Step ST1>

This step is a step of holding the one end section E1 of the optical fiber 1 wound around the bobbin 10 by the first pulling out unit 50 of the pulling out device 20 for the optical fiber 1 illustrated in FIG. 3. In one or more embodiments, the control unit CO causes the position detection unit 40 to detect the position of the one end section E1 hanging by its own weight in the direction of the rotation axis 10a. Then, the control unit CO controls the movement device, which is not illustrated, on the basis of the information stored in the storage unit ME and the signal input from the position detection unit 40, and moves the first pulling out unit 50 such that the one end section E1 of the optical fiber 1 is positioned between the contact units 52b of the pair of clamping pieces 52 of the clamping unit 51. The axis 51a of the first pulling out unit 50 thus moved and the rotation axis 10a of the bobbin 10 are maintained substantially parallel to each other. Next, the control unit CO brings the contact units 52b of the pair of clamping pieces 52 of the clamping unit 51 into contact with the cylinders 57 of the first pulling out unit 50. The clamping unit 51 clamps the one end section E1 in the direction of the axis 51a by the pair of clamping pieces 52. Thus, the first pulling out unit 50 holds the one end section E1 of the optical fiber 1 by the clamping unit 51. Therefore, it can be understood that the first pulling out unit 50 holds the one end section E1 on the basis of the signal indicating the position of the one end section E1 hanging by its own weight in the direction of the rotation axis 10a.

<First Pulling out Step ST2>

This step is a step of pulling out a predetermined portion of the optical fiber 1 wound around the bobbin 10 from the one end section E1 side in a state where the bobbin 10 rotates in a predetermined direction.

The control unit CO causes the motor 33 of the bobbin drive unit 30 to rotate the bobbin 10 about the rotation axis 10a at a predetermined speed. The predetermined direction, which is the rotation direction of the bobbin 10, is a direction in which the optical fiber 1 wound around the bobbin 10 is fed toward the one end section E1 side.

Figure 7:
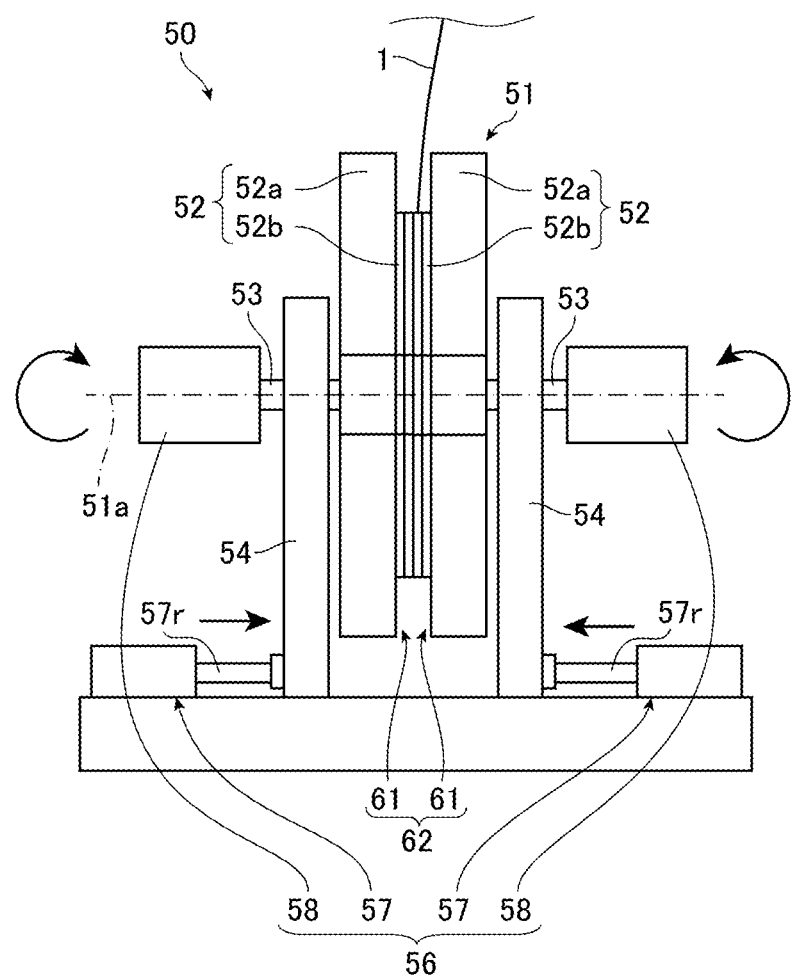
FIG. 7 is a diagram illustrating a state in which the first pulling out unit has wound an optical fiber by a method similar to that in FIG. 4.

Further, the control unit CO causes the motor 58 of the first pulling out unit 50 to rotate the clamping unit 51 a predetermined number of times. The clamping unit 51 clamps the one end section E1. Therefore, when the clamping unit 51 rotates, as illustrated in FIG. 7, the optical fiber 1 is wound around the outer peripheral surface of the clamping unit 51 relative to the axis 51a. That is, the first pulling out unit 50 winds the optical fiber 1 around the outer peripheral surface of the clamping unit 51 in a state where the bobbin 10 rotates in the aforementioned direction, and pulls out a predetermined portion of the optical fiber 1 wound around the bobbin 10 from the one end section E1 side. At this time, the first pulling out unit 50 pulls out the optical fiber 1 in a direction not parallel to the rotation axis 10a of the bobbin 10 and in a direction substantially perpendicular to the rotation axis 10a. When the clamping unit 51 rotates a predetermined number of times, the control unit CO causes the motor 33 of the bobbin drive unit 30 to stop the rotation of the bobbin 10. Note that the predetermined number of times is the number of times the predetermined portion of the optical fiber 1 wound around the bobbin 10 is pulled out. Here, when the length of the portion of the optical fiber 1 pulled out from the bobbin 10 is L, the diameter of the clamping unit 51 is D, and the rotation rate of the clamping unit 51 is n, L is approximately D×π×n.

In one or more embodiments, when the optical fiber 1 is wound by the clamping unit 51 as described above, the control unit CO controls the motor 58 so that the measurement value falls within a predetermined range on the basis of a signal input from a torque sensor, which is not illustrated, that measures the torque generated in the shaft 53. The tension generated in the optical fiber 1 to be wound tends to increase as the torque generated in the shaft 53 increases. Therefore, as the control unit CO controls the motor 58 as described above, the tension generated in the optical fiber 1 wound by the clamping unit 51 falls within the predetermined range. That is, the first pulling out unit 50 pulls out the aforementioned predetermined portion of the optical fiber 1 so that the tension generated in the aforementioned predetermined portion of the optical fiber 1 pulled out from the bobbin 10 falls within the predetermined range. Note that the control unit CO may cause the motor 58 to rotate the clamping unit 51 at a predetermined speed.

Here, as described above, the clamping piece 52 of the clamping unit 51 has the recess 61 along the outer edge on the surface of the side facing the other clamping piece 52. Then, the contact units 52b of the pair of clamping pieces 52 contact each other to clamp the one end section E1, so that a groove 62 including the recess 61 is formed on the outer peripheral surface of the clamping unit 51 relative to the axis 51a. Therefore, the first pulling out unit 50 can accommodate the optical fiber 1 wound around the clamping unit 51 in the groove 62. Note that it can be understood that the surface of each of the clamping pieces 52 on a side facing the other clamping piece 52 has the recess 61 that forms the groove 62 on the outer peripheral surface of the clamping unit 51 relative to the axis 51a in a state of clamping at least the one end section E1.

Figure 8:
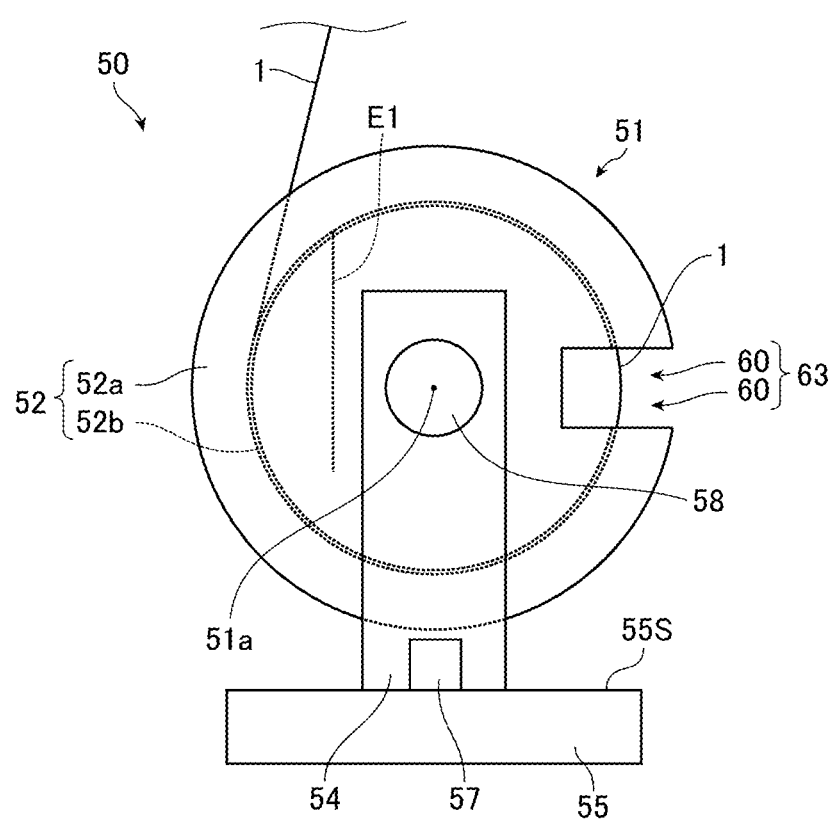
FIG. 8 is a diagram illustrating a state in which the first pulling out unit has wound an optical fiber by a method similar to that in FIG. 5.

Further, as described above, the pair of clamping pieces 52 has the notch 60 extending from the outer edge of the main body unit 52a to the axis 51a side beyond the outer edge of the contact unit 52b. Further, the clamping unit 51 rotates while the outer edges of the notches 60 of the pair of clamping pieces 52 when viewed from the direction of the axis 51a are suppressed from being misaligned. Therefore, as illustrated in FIG. 8, a groove 63 extending from one end to the other end in the direction of the axis 51a is formed by the notch 60 on the outer peripheral surface of the clamping unit 51 relative to the axis 51a in a state where at least the one end section E1 is clamped. That is, it can be understood that the pair of clamping pieces 52 has the notch 60 forming such groove 63. Then, the optical fiber 1 wound around the clamping unit 51 crosses the groove 63.

<Second Holding Step ST3>

This step is a step of holding the other end section E2 of the optical fiber 1 wound around the bobbin 10 by the second pulling out unit 70. Similar to the cylinders 57 of the first pulling out unit 50 in the first holding step ST1, the control unit CO controls the cylinders 57 of the second pulling out unit 70. Then, the other end section E2 hanging by its own weight of the optical fiber 1 is held by the pair of clamping pieces 52 of the clamping unit 51. Therefore, it can be understood that the second pulling out unit 50 holds the other end section E2 hanging by its own weight.

<Second Pulling Out Step ST4>

This step is a step of returning a part of the predetermined portion of the optical fiber 1 pulled out in the first pulling out step ST2 to the bobbin 10 in a state where the bobbin 10 rotates in a direction opposite to the predetermined direction in the first pulling out step ST2, and pulling out the other predetermined portion of the optical fiber 1 wound around the bobbin 10 from the other end section E2 side.

The control unit CO causes the motor 33 of the bobbin drive unit 30 to rotate the bobbin 10 about the rotation axis 10a at a predetermined speed. The rotation direction of the bobbin 10 is a direction in which the optical fiber 1 wound around the bobbin 10 is fed toward the other end section E2 side.

Further, the control unit CO causes the motor 58 of the first pulling out unit 50 to rotate the clamping unit 51 a predetermined number of times. The rotation direction is a direction opposite to the rotation direction in the first pulling out step ST2, and the rotation rate is lower than the rotation rate in the first pulling out step ST2. Therefore, a part of the predetermined portion of the optical fiber 1 pulled out in the first pulling out step ST2 is returned to the bobbin 10. At this time, the rotating bobbin 10 winds up a part of the predetermined portion of the optical fiber 1 pulled out from the one end section E1 side by the first pulling out unit 50. Then, when the clamping unit 51 of the first pulling out unit 50 rotates a predetermined number of times, the control unit CO causes the motor 33 of the bobbin drive unit 30 to stop the rotation of the bobbin 10.

When the optical fiber 1 is wound around the bobbin 10 while the optical fiber 1 is returned to the bobbin 10 from the first pulling out unit 50 as described above, the control unit CO controls the motor 58 on the basis of the signal input from the torque sensor, which is not illustrated, such that the tension generated in the optical fiber 1 returned from the first pulling out unit 50 falls within the predetermined range. That is, the first pulling out unit 50 returns a part of the aforementioned predetermined portion of the optical fiber 1 to the bobbin 10 so that the tension generated in a part of the aforementioned predetermined portion of the optical fiber 1 returned to the bobbin 10 falls within the predetermined range.

Further, the control unit CO causes the motor 58 of the second pulling out unit 70 to rotate the clamping unit 51 about the axis 51a. The clamping unit 51 clamps the other end section E2. Therefore, when the clamping unit 51 rotates, similar to the clamping unit 51 of the first pulling out unit 50 in the first pulling out step ST2, the optical fiber 1 is wound around the outer peripheral surface of the clamping unit 51 relative to the axis 51a. That is, the second pulling out unit 70 winds the optical fiber 1 around the outer peripheral surface of the clamping unit 51 and pulls out the other predetermined portion of the optical fiber 1 wound around the bobbin 10 from the other end section E2 side. At this time, the second pulling out unit 70 pulls out the optical fiber 1 in a direction not parallel to the rotation axis 10a of the bobbin 10 and in a direction substantially perpendicular to the rotation axis 10a. When the clamping unit 51 of the first pulling out unit 50 rotates a predetermined number of times, the control unit CO causes the motor 58 of the second pulling out unit 70 to stop the rotation of the clamping unit 51.

When the optical fiber 1 is wound by the clamping unit 51 of the second pulling out unit 70 as described above, the control unit CO controls the motor 58 so that the tension generated in the optical fiber 1 to be wound falls within the predetermined range on the basis of a signal input from the torque sensor, which is not illustrated. That is, the second pulling out unit 70 pulls out the aforementioned other predetermined portion of the optical fiber 1 so that the tension generated in the aforementioned other predetermined portion of the optical fiber 1 falls within the predetermined range.

Further, similar to the clamping unit 51 of the first pulling out unit 50, in a state where the clamping unit 51 of the second pulling out unit 70 clamps the other end section E2, the groove 62 including the recess 61 is formed on the outer peripheral surface of the clamping unit 51 relative to the axis 51a. Then, the second pulling out unit 70 can accommodate the optical fiber 1 wound around the clamping unit 51 in the groove 62.

Here, the optical fiber 1 wound around the bobbin 10 in this step is a part of the predetermined portion of the optical fiber 1 pulled out from the one end section E1 side by the first pulling out unit 50 in the first pulling out step ST2. That is, the bobbin 10 after the end of the second pulling out step ST4 is in a state where the optical fiber 1 has been pulled out from the one end section E1 side as compared with the case before the start of pulling out the optical fiber 1. Thus, the one end section E1 side and the other end section E2 side of the optical fiber 1 are pulled out from the bobbin 10.

Note that, in the optical fiber 1 pulled out from the bobbin 10, the length on the one end section E1 side is a length obtained by subtracting the length of the optical fiber 1 returned when the other end section E2 side of the optical fiber 1 is pulled out from the length of the predetermined portion of the pulled out optical fiber 1. The length on the one end section E1 side and the length on the other end section E2 side pulled out from the bobbin 10 as described above are appropriately set according to, for example, a distance between the bobbin 10 and a processing device to be described below, processing performed by the processing device, and the like. The length on the one end section E1 side and the length on the other end section E2 side may be different or substantially the same.

<Measurement Step ST5>

This step is a step of measuring the characteristics of the optical fiber 1. First, the pulling out device 20 for the optical fiber 1 positions both end sections of the optical fiber 1 pulled out as described above in the vicinity of the processing device, which is not illustrated. Specifically, the control unit CO controls the movement device, which is not illustrated, to move the first pulling out unit 50 and the second pulling out unit 70 to the vicinity of the processing device. At this time, the control unit CO causes the motor 58 of the first pulling out unit 50 and the motor 58 of the second pulling out unit 70 to rotate the clamping unit 51 so that the optical fiber 1 wound around the clamping unit 51 is fed from the clamping unit 51. Note that, similar to the first pulling out step ST2 and the second pulling out step ST4, the control unit CO controls the motors 58 such that the tension generated in the optical fiber 1 fed from the clamping unit 51 of the first pulling out unit 50 and the second pulling out unit 70 falls within a predetermined range. Then, the control unit CO stops the rotation of the motors 58 when the first pulling out unit 50 and the second pulling out unit 70 move to the vicinity of the processing device. For example, the processing device cuts the one end section E1 of the optical fiber 1 between the bobbin 10 and the clamping unit 51 of the first pulling out unit 50, and collects a part of the optical fiber 1 cut off from the optical fiber 1, e.g., a short optical fiber of about several meters, as a first sample. The first sample thus collected is conveyed to, for example, a first measurement device, and the first measurement device measures a structural parameter and an optical parameter of the optical fiber using the first sample. Further, after obtaining the first sample as described above, the processing device performs predetermined processing such as removal of the coating layer and processing of making the end surface flat and like on the one end section E1 and the other end section E2 of the long optical fiber 1 wound around the bobbin 10, and connects the one end section E1 and the other end section E2 to a second measurement device, which is not illustrated. Then, the second measurement device to which the one end section E1 and the other end section E2 are connected measures the characteristics of the long optical fiber 1. Examples of the second measurement device include an OTDR. Further, the processing device collects the optical fiber remaining in the clamping unit 51 after collecting the short optical fiber described above, and stores the optical fiber as a second sample. Therefore, it can be understood that after the one end section E1 side and the other end section E2 side of the optical fiber 1 are pulled out from the bobbin 10, the processing device cuts the one end section E1 of the optical fiber 1 to obtain the first sample and the second sample as a part of the optical fiber 1, and then connects the one end section E1 and the other end section E2 of the optical fiber 1 wound around the bobbin 10 to the second measurement device.

Thus, in one or more embodiments, the optical fiber 1 is inspected.

Note that it is sufficient if the processing device connects the one end section E1 and the other end section E2 of the optical fiber 1 to the second measurement device after the one end section E1 side and the other end section E2 side of the optical fiber 1 are pulled out from the bobbin 10. For example, the processing device may cut at least one of the one end section E1 and the other end section E2 of the optical fiber 1 to obtain a part of the optical fiber 1, and then connect the one end section E1 and the other end section E2 of the optical fiber 1 wound around the bobbin 10 to the second measurement device. Further, a part of the optical fiber 1 obtained by the processing device may not be a sample. Further, the processing device may connect the one end section E1 and the other end section E2 of the optical fiber 1 wound around the bobbin 10 to the second measurement device without obtaining a part of the optical fiber 1. Further, collection of the first sample and the second sample, which are a part of the optical fiber 1, connection of the one end section E1 and the other end section E2 of the optical fiber 1 wound around the bobbin 10 to the second measurement device, and the like may be performed by the operator.

As described above, the method for pulling out the optical fiber 1 according to one or more embodiments includes the first holding step ST1, the first pulling out step ST2, the second holding step ST3, and the second pulling out step ST4. Further, the pulling out device 20 for the optical fiber 1 of one or more embodiments includes the first pulling out unit 50 and the second pulling out unit 70. Then, by the method for pulling out the optical fiber 1 and with the pulling out device 20 for the optical fiber 1 of one or more embodiments, as described above, the one end section E1 side, which is one end side, and the other end section E2 side, which is the other end side, of the optical fiber 1 can be pulled out from the bobbin 10.

Further, by the method for pulling out the optical fiber 1 and with the pulling out device 20 for the optical fiber 1 of one or more embodiments, since the optical fiber 1 is pulled out in a state where the bobbin 10 rotates, it is possible to suppress twisting of the pulled out optical fiber 1.

Further, the pulling out device 20 for the optical fiber 1 of one or more embodiments further includes the bobbin drive unit 30 that rotates the bobbin 10 about the rotation axis 10a. The bobbin drive unit 30 rotates the bobbin 10 in a predetermined direction when the first pulling out unit 50 pulls out the predetermined portion of the optical fiber 1 from the one end section E1 side. Further, the bobbin drive unit 30 rotates the bobbin 10 in a direction opposite to the predetermined direction when the second pulling out unit 70 pulls out the other predetermined portion of the optical fiber 1 from the other end section E2 side. Therefore, the pulling out device 20 for the optical fiber 1 of one or more embodiments can reduce the tension generated in the optical fiber 1 when the optical fiber 1 is pulled out as compared with the case where the bobbin drive unit 30 for rotating the bobbin 10 is not provided.

Further, with the pulling out device 20 for the optical fiber 1 of one or more embodiments, the first pulling out unit 50 and the second pulling out unit 70 pull out the optical fiber 1 in a direction not parallel to the rotation axis 10a of the bobbin 10. Therefore, as compared with the case where the optical fiber 1 is pulled out in a direction parallel to the rotation axis 10a, for example, it is possible to suppress that the optical fiber 1 is unintentionally pulled out from the bobbin 10 and twisting occurs in the pulled out optical fiber 1. Note that, from the viewpoint of suppression of twisting, the optical fiber 1 may be pulled out in a direction substantially perpendicular to the rotation axis 10a of the bobbin 10.

Further, with the pulling out device 20 for the optical fiber 1 of one or more embodiments, the first pulling out unit 50 pulls out the predetermined portion of the optical fiber 1 so that the tension generated in the predetermined portion of the optical fiber 1 pulled out from the bobbin 10 falls within the predetermined range. Further, the first pulling out unit 50 returns a part of the predetermined portion of the optical fiber 1 to the bobbin 10 so that the tension generated in a part of the predetermined portion of the optical fiber 1 returned to the bobbin 10 falls within the predetermined range. Further, the second pulling out unit 70 pulls out the other predetermined portion of the optical fiber 1 so that the tension generated in the other predetermined portion of the optical fiber 1 falls within the predetermined range. For this reason, the pulling out device 20 for the optical fiber 1 of one or more embodiments can suppress that the optical fiber 1 is slackened when the optical fiber 1 is pulled out and the optical fiber 1 is caught by another member or the like. Further, the pulling out device 20 for the optical fiber 1 of one or more embodiments can suppress that the tension generated in the optical fiber 1 excessively increases when the optical fiber 1 is pulled out.

Further, with the pulling out device 20 for the optical fiber 1 of one or more embodiments, the first pulling out unit 50 and the second pulling out unit 70 pull out the optical fiber 1 by winding the optical fiber 1. Therefore, with the pulling out device 20 for the optical fiber 1 of one or more embodiments, it is possible to suppress an increase in size of the pulling out device 20 for the optical fiber 1 as compared with the case where the first pulling out unit 50 and the second pulling out unit 70 pull out the optical fiber 1 without winding the optical fiber 1.

Further, with the pulling out device 20 for the optical fiber 1 of one or more embodiments, the first pulling out unit 50 and the second pulling out unit 70 have the clamping unit 51 including the pair of clamping pieces 52 facing each other in the direction of the axis 51a. The clamping unit 51 clamps the one end section E1 in the direction of the axis 51a by the pair of clamping pieces 52. Then, the clamping unit 51 rotates about the axis 51a in a state of clamping the end sections E1 and E2 of the optical fiber 1, and winds the optical fiber 1 around the outer peripheral surface relative to the axis 51a to pull out the optical fiber 1. Further, the pair of clamping pieces 52 has the notch 60. The notch 60 forms the groove 63 extending from one end to the other end in the direction of the axis 51a on the outer peripheral surface of the clamping unit 51 relative to the axis 51a in a state where at least the pair of clamping pieces 52 clamps the one end section E1. Therefore, the optical fiber 1 wound around the aforementioned outer peripheral surface of the clamping unit 51 crosses the groove 63 described above, and a gap is formed in a part between the aforementioned outer peripheral surface of the clamping unit 51 and the optical fiber 1 wound around the outer peripheral surface. Therefore, as compared with the case where the groove 63 is not formed in the clamping unit 51, the pulling out device 20 for the optical fiber 1 of one or more embodiments can easily grip the optical fiber 1 wound around the clamping unit 51, and can easily handle the optical fiber 1 pulled out by the first pulling out unit 50 or the second pulling out unit 70. For example, when the optical fiber 1 is cut between the bobbin 10 and the clamping unit 51, a portion of the optical fiber 1 wound around the clamping unit 51 crossing the groove 63 is gripped, and then the clamping of the optical fiber 1 by the clamping unit 51 is released, so that the pulled out optical fiber 1 in a ring shape can be collected.

Further, with the pulling out device 20 for the optical fiber 1 of one or more embodiments, the control unit CO moves the first pulling out unit 50 on the basis of a signal input from the position detection unit 40, and causes the first pulling out unit 50 to hold the one end section E1 of the optical fiber 1. Therefore, the first pulling out unit 50 holds the one end section E1 on the basis of the signal indicating the position of the one end section E1 hanging by its own weight in the direction of the rotation axis 10a. Further, the second pulling out unit 70 is arranged such that the other end section E2 is positioned between the pair of clamping pieces 52, and the control unit CO causes the second pulling out unit 70 to hold the other end section E2 of the optical fiber 1. Therefore, the pulling out device 20 for the optical fiber 1 can automatically pull out the one end section E1 side and the other end section E2 side of the optical fiber 1 from the bobbin 10.

Second Example

Next, one or more embodiments of the present invention will be described in detail with reference to FIGS. 9 and 10. Note that the same or equivalent components as those of the embodiments described above are designated by the same reference numerals and duplicated description will be omitted unless otherwise specified.

As in the embodiments described above, the method for pulling out the optical fiber 1 according to the one or more embodiments includes the first holding step ST1, the first pulling out step ST2, the second holding step ST3, and the second pulling out step ST4. However, in one or more embodiments, the configuration of the first pulling out unit of the pulling out device 20 for the optical fiber 1 is different from the configuration of the first pulling out unit 50 of the embodiments described above.

Figure 9:
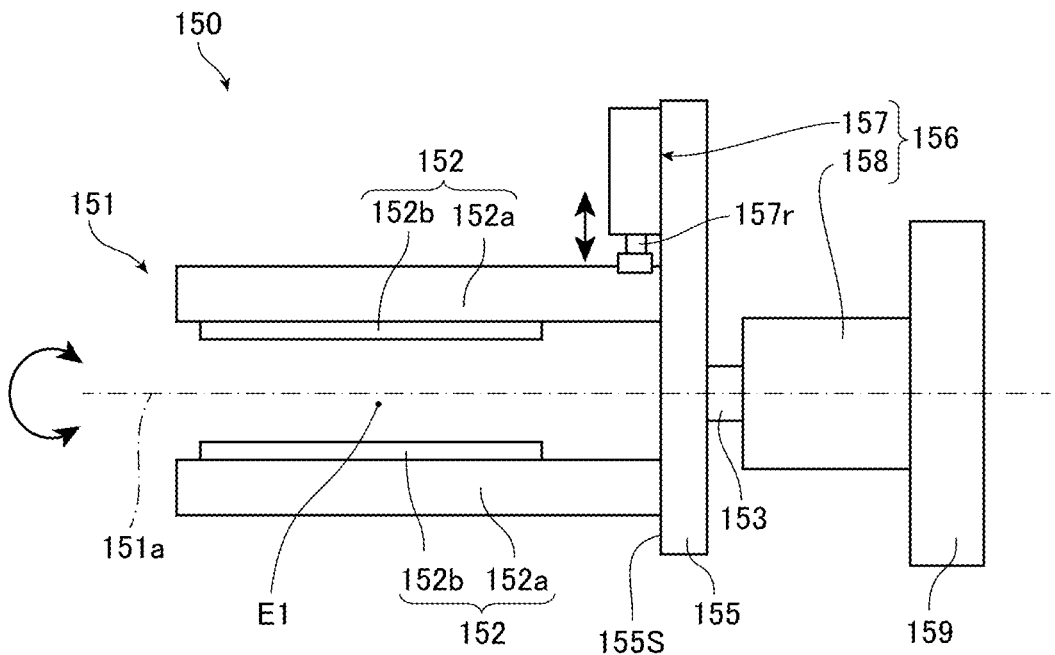
FIG. 9 is a diagram schematically illustrating a first pulling out unit according to one or more embodiments of the present invention.
Figure 10:
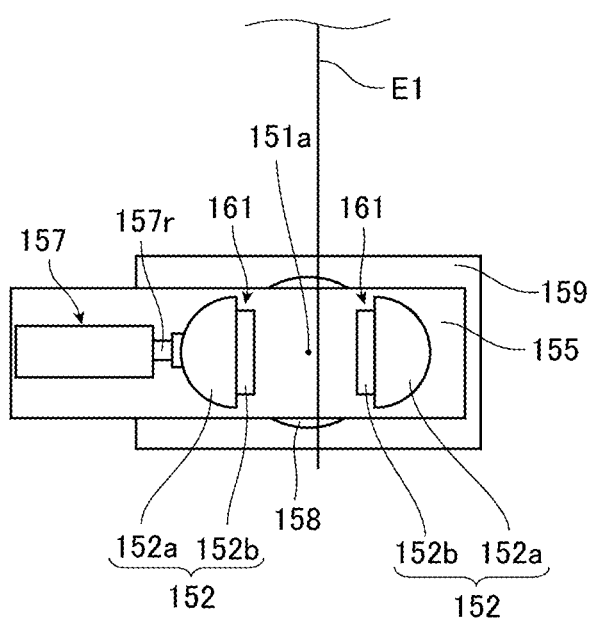
FIG. 10 is a diagram of the first pulling out unit illustrated in FIG. 9 as viewed from another direction.

FIG. 9 is a diagram schematically illustrating the first pulling out unit according to one or more embodiments of the present invention, and is a diagram of the first pulling out unit as viewed from above. Further, FIG. 10 is a diagram of the first pulling out unit illustrated in FIG. 9 as viewed from another direction, and is a diagram as viewed from a direction of a predetermined axis 151a described below. As illustrated in FIGS. 9 and 10, a first pulling out unit 150 of one or more embodiments includes a clamping unit 151, a support unit 155, a drive unit 156, and a base unit 159. As in the embodiments described above, the first pulling out unit 150 of one or more embodiments can be arranged at a position below a sensor 41 by a movement device, which is not illustrated. The control unit CO causes the movement device to arrange the first pulling out unit 150 at a position. Examples of the movement device include a robot arm that grips the base unit 159.

The clamping unit 151 includes a pair of clamping pieces 152 facing each other in a direction substantially perpendicular to the direction of the predetermined axis 151a. In one or more embodiments, the axis 151a extends substantially parallel to a rotation axis 10a, and each of the pair of clamping pieces 152 has a main body unit 152a and a contact unit 152b. Each of the main body units 152a is a member having a substantially semi-columnar shape extending in the direction of the axis 151a and having a flat surface on a side facing the other main body unit 152a. The flat surface of the main body unit 152a on the side facing the other main body unit 152a is substantially parallel. Each of the contact units 152b is a sheet-like elastic member attached to the flat surface of the main body unit 152a on the side facing the other main body unit 152a. The outer shape of each of the contact units 152b is a rectangle elongated in the direction of the axis 151a, and the width of each of the contact units 152b in the short direction is smaller than the width of the flat surface of the main body unit 152a to which the contact unit 152b is attached. Then, a recess 161 along the outer edge is formed on a surface of the clamping piece 152 on a side facing the other clamping piece 152. Further, the contact units 152b overlap each other in the direction in which the pair of clamping pieces 152 faces each other. Examples of the material constituting the main body unit 152a include metal such as aluminum, and examples of the material constituting the contact unit 152b include rubber.

The support unit 155 is a member that supports the clamping unit 151. In one or more embodiments, the support unit 155 is a member having a plate shape extending in a direction substantially perpendicular to the axis 151a, and a surface 155S of the support unit 155 on one side is a plane substantially perpendicular to the axis 151a. One clamping piece 152 of the clamping unit 151 is fixed to the surface 155S of the support unit 155. Further, the other clamping piece 152 is movably attached to the surface 155S of the support unit 155. Specifically, the other clamping piece 152 is attached to the surface 155S so that the other clamping piece 152 moves in a direction in which the pair of clamping pieces 152 faces each other such that the state is switched between the state in which the contact units 152b of the pair of clamping pieces 152 contact each other and the state in which the contact units 152b of the pair of clamping pieces 152 are separated. Thus, the clamping unit 151 is supported by the support unit 155. Further, a shaft 153 having a columnar shape extending along the axis 151a is fixed to the support unit 155 on the side opposite to the side where the pair of clamping pieces 152 is located. A torque sensor, which is not illustrated, that measures the torque generated in the shaft 153 and outputs a signal corresponding to the measurement value to the control unit CO is attached to the shaft 153.

The drive unit 156 of one or more embodiments is a member that moves the other clamping piece 152 described above in a direction in which the pair of clamping pieces 152 faces each other and rotates the clamping unit 151 about the axis 151a. The drive unit 156 includes a cylinder 57 that moves the other clamping piece 152 described above in a direction in which the pair of clamping pieces 152 faces each other, and a motor 158 that rotates the support unit 155 supporting the clamping unit 151 about the axis 151a. The cylinder 157 is attached to the surface 155S of the support unit 155. The tip of a rod 157r of the cylinder 157 is fixed to the other clamping piece 152 described above. The cylinder 157 moves the rod 157r to move the other clamping piece 152 described above in a direction in which the pair of clamping pieces 152 faces each other. Then, in the first pulling out unit 150, the cylinder 157 can switch the clamping unit 151 between the state in which the contact units 152b of the pair of clamping pieces 152 contact each other and the state in which the contact units 152b of the pair of clamping pieces 152 are separated. The cylinder 157 performs this switching in accordance with a control signal from the control unit CO.

The shaft 153 fixed to the support unit 155 is connected to the motor 158. The motor 158 rotates the shaft 153 about the axis 151a to rotate the clamping unit 151 about the axis 151a. The motor 158 is fixed to the base unit 159. The motor 158 adjusts the rotation speed and the rotation direction of the shaft 153 about the axis 151a in accordance with a control signal from the control unit CO to adjust the rotation speed and the rotation direction of the clamping unit 51 about the axis 151a.

In the first holding step ST1 of one or more embodiments, the control unit CO controls the movement device, which is not illustrated, as in the embodiments described above. Then, the control unit CO causes the movement device to move the first pulling out unit 150 such that the one end section E1 of the optical fiber 1 is positioned between the contact units 152b of the pair of clamping pieces 152 of the clamping unit 51. Next, the control unit CO controls the cylinder 157 of the first pulling out unit 150 to cause the one end section E1 to be clamped by the pair of clamping pieces 152 of the clamping unit 151.

Figure 11:
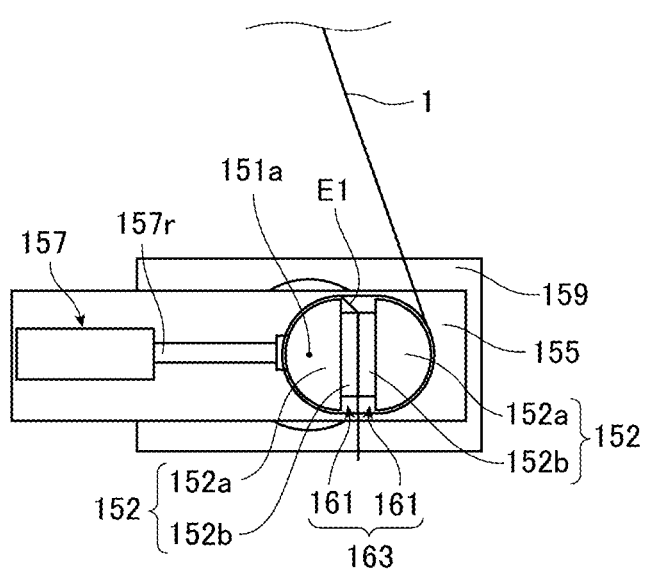
FIG. 11 is a diagram illustrating a state in which the first pulling out unit has wound an optical fiber by a method similar to that in FIG. 10.

Further, in the first pulling out step ST2 of one or more embodiments, the control unit CO causes the motor 158 of the first pulling out unit 150 to rotate the clamping unit 151 a predetermined number of times while the bobbin 10 is rotating in a predetermined direction. Since the clamping unit 151 clamps the one end section E1, as illustrated in FIG. 11, the optical fiber 1 is wound around the outer peripheral surface of the clamping unit 51 relative to the axis 151a. That is, the first pulling out unit 150 winds the optical fiber 1 around the outer peripheral surface of the clamping unit 151 in a state where the bobbin 10 rotates in the aforementioned predetermined direction, and pulls out a predetermined portion of the optical fiber 1 wound around the bobbin 10 from the one end section E1 side. Then, when the clamping unit 151 rotates a predetermined number of times, the control unit CO causes the motor 33 of the bobbin drive unit 30 to stop the rotation of the bobbin 10.

Here, as described above, the recess 161 along the outer edge is formed on the surface of the clamping piece 152 of the clamping unit 151 on the side facing the other clamping piece 152. Then, as illustrated in FIG. 11, a groove 163 extending from one end to the other end in the direction of the axis 151a is formed by the recess 161 on the outer peripheral surface of the clamping unit 151 relative to the axis 151a in a state where at least the one end section E1 is clamped. That is, it can be understood that each of the pair of clamping pieces 152 has the recess 161 and the recess 161 forms the groove 163 extending from one end to the other end in the direction of the axis 151a on the outer peripheral surface of the clamping unit 151 relative to the axis 151a in a state of clamping at least the one end section E1. Then, the optical fiber 1 wound around the clamping unit 151 crosses the groove 163. Thus, as compared with the case where the groove 163 is not formed in the clamping unit 151, the pulling out device 20 for the optical fiber 1 of one or more embodiments can easily grip the optical fiber 1 wound around the clamping unit 151, and can easily handle the optical fiber 1 pulled out by the first pulling out unit 150.

In one or more embodiments, when the optical fiber 1 is wound by the clamping unit 151 as described above, the control unit CO controls the motor 158 so that the measurement value falls within a predetermined range on the basis of a signal input from a torque sensor, which is not illustrated, that measures the torque generated in the shaft 153 as in the embodiments described above. Then, the first pulling out unit 50 pulls out the optical fiber 1 so that the tension generated in the optical fiber 1 falls within the predetermined range. Note that the control unit may cause the motor 158 to rotate the clamping unit 151 at a predetermined speed.

Further, in the second pulling out step ST4 of one or more embodiments, the control unit CO causes the motor 158 of the first pulling out unit 150 to rotate the clamping unit 151 a predetermined number of times while the bobbin 10 is rotating in a direction opposite to the predetermined direction. Then, the first pulling out unit 150 returns a part of the predetermined portion of the optical fiber 1 pulled out in the first pulling out step ST2 to the bobbin 10. The bobbin 10 winds up a part of the predetermined portion of the optical fiber 1 pulled out from the one end section E1 side by the first pulling out unit 150. Then, when the clamping unit 151 of the first pulling out unit 150 rotates a predetermined number of times, the control unit CO causes the motor 33 of the bobbin drive unit 30 to stop the rotation of the bobbin 10.

When the optical fiber 1 is wound around the bobbin 10 while the optical fiber 1 returns to the bobbin 10 from the first pulling out unit 150 as described above, the first pulling out unit 50 returns the optical fiber 1 so that the tension generated in the optical fiber 1 falls within a predetermined range as in the embodiments described above.

As in the embodiments described above, the second pulling out unit 70 pulls out the other predetermined portion of the optical fiber 1 wound around the bobbin 10 from the other end section E2 side. Thus, even by the method for pulling out the optical fiber and with the pulling out device 20 for the optical fiber of one or more embodiments, the one end section E1 side, which is one end side, and the other end section E2 side, which is the other end side, of the optical fiber 1 can be pulled out from the bobbin 10.

Although the present invention has been described above by taking the aforementioned embodiments as an example, the present invention is not limited thereto.

For example, in the embodiments described above, the first pulling out units 50 and 150 that pull out the predetermined portion of the optical fiber from the one end section E1 side by winding the optical fiber 1 in a state where the bobbin 10 rotates, and return a part of the predetermined portion of the pulled out optical fiber to the bobbin have been described as an example. Further, the second pulling out unit 70 that pulls out the other predetermined portion of the optical fiber 1 from the other end section E2 side by winding the optical fiber 1 in a state where the bobbin 10 rotates has been described as an example. However, it is sufficient if the first pulling out unit can pull out the predetermined portion of the optical fiber from the one end section E1 side in a state where the bobbin 10 rotates and return a part of the predetermined portion of the pulled out optical fiber to the bobbin. Further, it is sufficient if the second pulling out unit can pull out the other predetermined portion of the optical fiber 1 from the other end section E2 side in a state where the bobbin 10 rotates. For example, the first pulling out unit may be configured to pull out the predetermined portion of the optical fiber 1 from the one end section E1 side by moving in a predetermined direction and return a part of the predetermined portion of the pulled out optical fiber 1 to the bobbin 10 by moving in a direction opposite to the predetermined direction. Further, the second pulling out unit may be configured to pull out the other predetermined portion of the optical fiber 1 from the other end section E2 side by moving in a predetermined direction. In such a case, the optical fiber between the bobbin 10 and the first pulling out unit may be looped over one or more pulleys, and the optical fiber between the bobbin 10 and the second pulling out unit may be looped over one or more pulleys. With such a configuration, the degree of freedom in the moving direction of the first pulling out unit and the second pulling out unit can be improved, and an increase in size of the device for pulling out an optical fiber can be suppressed.

Further, in the embodiments described above, the first pulling out units 50 and 150 that pull out the optical fiber 1 and return the optical fiber 1 so that the tension generated in the optical fiber 1 falls within the predetermined range by using the torque sensor have been described as an example. Further, the second pulling out unit 70 that pulls out the optical fiber 1 so that the tension generated in the optical fiber 1 falls within the predetermined range by using the torque sensor has been described as an example. However, the first pulling out unit and the second pulling out unit may pull out the optical fiber 1 or return the optical fiber 1 such that the tension generated in the optical fiber 1 falls within a predetermined range by using a sensor or the like other than the torque sensor. For example, in a case where the first pulling out unit 50 of the embodiments described above includes a sensor that measures the rotational speed of the motor 58, the control unit CO may control the motor 58 on the basis of a signal input from the sensor, a voltage or a current applied to the motor 58, or the like. Further, the first pulling out unit and the second pulling out unit may pull out the optical fiber 1 or return the optical fiber 1 regardless of the tension generated in the optical fiber 1. With such a configuration, the configuration of the pulling out device 20 for the optical fiber 1 can be simplified. Further, the bobbin drive unit 30 may adjust the rotation speed of the bobbin 10 so that the tension generated in the optical fiber 1 falls within a predetermined range.

Further, in the embodiments described above, the first pulling out units 50 and 150 and the second pulling out unit 70 that hold the end sections by clamping the end sections of the optical fiber 1 with the clamping units 51 and 151 have been described as an example. However, it is sufficient if the first pulling out unit and the second pulling out unit can hold the end sections of the optical fiber 1, and the configuration and method of the first pulling out unit and the second pulling out unit for holding the end sections of the optical fiber 1 are not particularly limited. For example, the operator may attach the end sections of the optical fiber 1 to the first pulling out unit or the second pulling out unit. In this case, the device for pulling out an optical fiber may not include the position detection unit 40, and the configuration of the device for pulling out an optical fiber can be simplified.

Further, in the embodiments described above, the optical fiber pulling out device 20 including the position detection unit 40 that detects the position of the one end section E1 hanging by its own weight in the direction of the rotation axis 10a has been described as an example. However, the device for pulling out an optical fiber may further include another position detection unit that detects the position of the other end section E2 hanging by its own weight in the direction of the rotation axis 10a. As a configuration of another position detection unit, for example, the same configuration as the position detection unit 40 of the embodiments described above can be exemplified, and another position detection unit outputs a signal indicating the position of the other end section E2 hanging by its own weight in the direction of the rotation axis 10a to the control unit CO. In this case, the second pulling out unit 70 may be arranged at a position by the movement device. With such a configuration, the control unit CO can move the second pulling out unit 70 on the basis of a signal input from another position detection unit and cause the second pulling out unit 70 to hold the other end section E2 of the optical fiber 1. In other words, the second pulling out unit 70 can hold the other end section E2 on the basis of a signal indicating the position of the other end section E2 hanging by its own weight in the direction of the rotation axis 10a. Therefore, such a device for pulling out an optical fiber can automatically pull out the one end section E1 side and the other end section E2 side of the optical fiber 1 from the bobbin 10 regardless of the initial position of the second pulling out unit 70. Further, the device for pulling out an optical fiber may not include the position detection unit that detects the positions of the one end section E1 and the other end section E2.

Further, in the embodiments described above, the optical fiber pulling out device 20 including the bobbin drive unit 30 has been described as an example. However, the device for pulling out an optical fiber may not include the bobbin drive unit 30. In this case, the bobbin 10 is supported to be rotatable about the rotation axis 10a. Then, in the first pulling out step ST2, the first pulling out unit 50 pulls out the predetermined portion of the optical fiber 1 from the one end section E1 side while rotating the bobbin 10 about the rotation axis 10a by the tension generated in the predetermined portion of the optical fiber 1. In the second pulling out step ST4, the second pulling out unit 70 pulls out the other predetermined portion of the optical fiber 1 from the other end section E2 side while rotating the bobbin 10 about the rotation axis 10a by the tension generated in the other predetermined portion of the optical fiber 1.

As described above, according to the present invention, a device for pulling out an optical fiber capable of pulling out one end side and the other end side of an optical fiber from a bobbin, a method for pulling out an optical fiber, and a method for inspecting an optical fiber are provided, and it is expected that they are used not only in the field of inspection (performance measurement) after manufacturing an optical fiber but also in the field of communication or the like in which an optical fiber is actually handled.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A device for pulling out an optical fiber from a bobbin around which the optical fiber is wound, the device comprising:
   a bobbin support that supports the bobbin rotatably about a rotation axis;
   a first pulling out unit that:
      holds a first end section of the optical fiber, pulls out a first predetermined portion of the optical fiber wound around the bobbin from a side of the first end section in a state where the bobbin rotates in a predetermined direction, and
      then returns a part of the first predetermined portion to the bobbin in a state where the bobbin rotates in a direction opposite to the predetermined direction; and
   a second pulling out unit that:
      holds a second end section of the optical fiber after the first pulling out unit pulls out the first predetermined portion from the side of the first end section, and
      pulls out a second predetermined portion of the optical fiber wound around the bobbin from a side of the second end section when the first pulling out unit returns the part of the first predetermined portion to the bobbin.

2. The device according to claim 1, further comprising:
   a rotary driver that rotates the bobbin about the rotation axis, wherein the rotary driver:
      rotates the bobbin in the predetermined direction when the first pulling out unit pulls out the first predetermined portion from the side of the first end section, and
      rotates the bobbin in a direction opposite to the predetermined direction when the first pulling out unit returns the part of the first predetermined portion to the bobbin.

3. The device according to claim 1, wherein one or both of the first pulling out unit and the second pulling out unit pulls out the optical fiber in a direction not parallel to the rotation axis.

4. The device according to claim 1, wherein
   the first pulling out unit:
      pulls out the first predetermined portion such that tension, generated in the first predetermined portion pulled out from the bobbin, falls within a predetermined range, and
      returns the part of the first predetermined portion to the bobbin such that tension, generated in the part of the first predetermined portion returned to the bobbin, falls within the predetermined range, and
   the second pulling out unit pulls out the second predetermined portion such that tension, generated in the second predetermined portion, falls within the predetermined range.

5. The device according to claim 1, wherein one or both of the first pulling out unit and the second pulling out unit pulls out the optical fiber by winding the optical fiber.

6. The device according to claim 5, wherein
   one or both of the first pulling out unit and the second pulling out unit comprises a clamp comprising a pair of clamping pieces facing one another in a direction of a predetermined axis, and
   the clamp:
      clamps a corresponding one of the first end section and the second end section in the direction of the predetermined axis by the pair of clamping pieces,
      rotates about the predetermined axis in a state of clamping the corresponding one, and
      winds the optical fiber around an outer peripheral surface of the clamp relative to the predetermined axis to pull out the optical fiber.

7. The device according to claim 6, wherein
   each of the pair of clamping pieces comprises a notch, and
   the notch forms a groove extending from a first end of the notch to a second end of the notch in the direction of the predetermined axis on the outer peripheral surface in a state where the pair of clamping pieces clamps the corresponding one of the first end section and the second end section.

8. The device according to claim 1, further comprising:
   a position detector that outputs a signal indicating a position of the first end section hanging by its own weight in the direction of the rotation axis, wherein
   the first pulling out unit holds the first end section hanging by its own weight based on the signal.

9. The device according to claim 1, further comprising:
   a position detector that outputs a signal indicating a position of the second end section hanging by its own weight in the direction of the rotation axis, wherein
   the second pulling out unit holds the second end section hanging by its own weight based on the signal.

* * * * *